MECHANICAL FREQUENCY CONTROL IN A KLYSTRON TUBE COMPRISING A DIRECTLY ATTACHED RECTANGULAR CAVITY RESONATOR

Filed Jan. 15, 1962

INVENTORS
GERHARD WALTER
MARTIN MÜLLER

BY [signature]

ATTORNEY

United States Patent Office 3,226,662
Patented Dec. 28, 1965

3,226,662

MECHANICAL FREQUENCY CONTROL IN A KLYSTRON TUBE COMPRISING A DIRECTLY ATTACHED RECTANGULAR CAVITY RESONATOR

Gerhard Walter and Martin Müller, Pforzheim, Germany, assignors to International Standard Electric Corporation, New York, N.Y., a corporation of Delaware Filed Jan. 15, 1962, Ser. No. 166,033
Claims priority, application Germany, Jan. 24, 1961, St 17,380
5 Claims. (Cl. 333—83)

Figure 1:
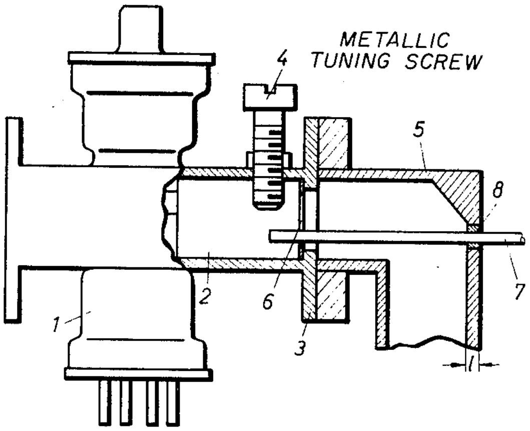

This invention relates to tuning of klystron tubes and particularly to a novel device providing fine control of frequency in an associated resonant cavity.

As is well-known, a resonator is coupled to the so-called control gap of a klystron. In the customary types of klystron tubes an additional external, generally rectangular type of cavity resonator is so tightly coupled to this internal resonator, that the external resonator largely determines the operating frequency of the klystron. This external resonator forms one unitary structure with the klystron, and its resonant frequency is varied by a tuning screw which is screwed-in parallel in relation to the electric field existing in the resonating cavity. The achievement of relatively large range variation with the aid of such types of tuning screws, however, is opposed by the disadvantage of a low adjusting accuracy, so that these screws are not very suitable for effecting a fine adjustment of the operating frequency of the klystron, as is required for the automatic retuning of the klystron to a reference frequency for balancing or compensating any frequency variations which are due to temperature variations. This difficulty is all the more applicable, as the aforementioned tuning screws are metallically directly connected to the resonating cavity, so that during the turning of the screws, the uncontrollable contact pressure between the screw and the resonating cavity is likely to cause frequency leaps, and furthermore a relatively high power is required for moving this contact-making tuning means.

For this reason an electronic type of retuning is generally employed, by simply changing the reflector voltage of the klystron. In the case of directly modulated klystrons, however, the electronic type of retuning cannot be used, because every alteration of the reflected voltage has a detrimental effect upon the linearity of the modulation characteristic of the klystron. For this reason, in the case of directly modulated klystrons, it is only possible to employ mechanical tuning of the resonating cavity to obtain frequency retuning, but the possibility of effecting this with the aid of the already mentioned tuning screw has to be eliminated for the reasons outlined above.

It has been known to cause variation of the frequency of a circular cavity resonator enclosing the control gap of a klystron tube, with the aid of a ceramic bar that is moved in or out vertically in relation to the electric field existing in the resonator. For the purpose of enlarging the tuning range with the aid of a ceramic bar, the surface of the latter is partly provided with a silver coating. However, klystron tubes are now rarely built with the above mentioned circular cavity resonator enclosing its control gap, and with the associated tuning arrangement, because of the difficulty in providing a tight vacuum sealing of the tube, and are thus no longer available to the manufacturer of apparatus. In addition, this type of tuning was only used for effecting coarse frequency tuning, and is unsuitable for fine frequency retuning purposes, as is the above mentioned tuning screw arranged on rectangular types of cavity resonators.

It is therefore one object of the present invention to provide a mechanical type of retuning arrangement for klystrons with a directly attached rectangular cavity resonator. In solving this problem attention has to be paid to the requirement that this solution should minimize any constructional alterations of the tube and its cavity resonator in order to enable an easy replacement thereof.

According to the invention this is accomplished in that a bar of a dielectric, non-conducting material is passed through the diaphragm opening of the cavity resonator to act as a frequency-regulating element capable of being displaced in the axial direction. This bar is supported with one end in the wall of the rectangular waveguide piece or section serving a decoupling function.

According to a further embodiment of the invention the coupling waveguide or rectangular waveguide section is flanged in a staggered or off-set manner to the cavity resonator, so that the bar can be supported in a boring provided in the flange thereof, thus providing substantially more stable guiding of the bar.

Figures 2, 3:
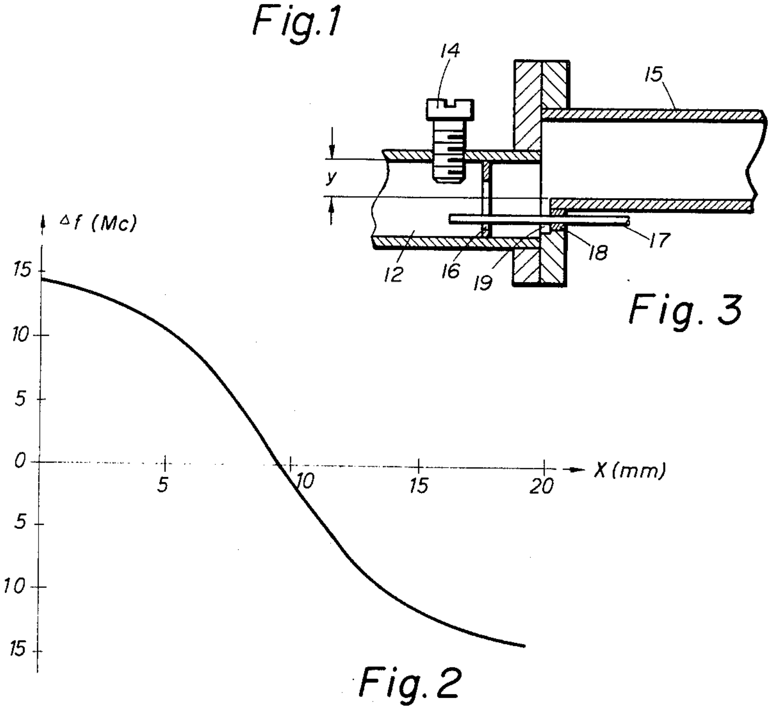
Figure 4:
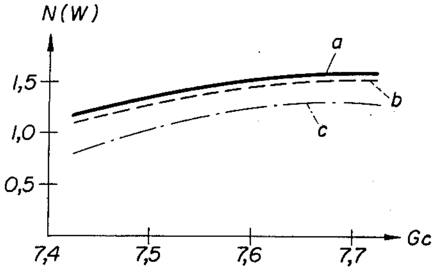

The invention will now be explained in detail with reference to FIGS. 1–4 of the accompanying drawings, in which:

FIGS. 1 and 3 show examples of embodiments of the invention partly in sectional elevation, and FIGS. 2 and 4 present diagrammatic illustrations of the results obtainable with the aid of the invention.

According to FIG. 1 the klystron tube 1 is provided with a cavity resonator 2, to form a self-contained and replaceable unitary structure with this cavity resonator and its coupling flange 3. A tuning screw 4, which is capable of changing its position parallel in relation to the direction of the electric field, is provided for tuning the klystron frequency. It is well-known that the effect upon the resonant frequency of tuning means inserted into the cavity resonator, is the strongest where the field component affected thereby, has its highest value. An angular waveguide section 5 is flanged to the resonator to permit the transfer of the energy coupled out via the diaphragm opening 6 of the resonator. For effecting the fine balancing of the resonant frequency of the resonator, as is particularly required for mechanical automatic readjustment of the klystron without any changes or alterations of the klystron tube, there is provided a bar 7 of a dielectric material, preferably a cylindrical ceramic bar which is moveable in its axial direction. The bar passes through the diaphragm opening 6 and into the resonator to a desired extent at a position below and adjacent the main tuning screw 4 as shown, and only causes a slight alteration of the resonant frequency of the resonator dependent upon the range of movement (stroke). This bar is supported in a boring (hole) 8 provided in the wall of the angular waveguide section. The thickness of the wall is so dimensioned as to provide a sufficiently high attenuation to wave modes to prevent penetration to the outside, so that, consequently, the external space is free from an electric field. A grommet 8 of insulating material is provided in order to prevent a metallic abrasion which, in the form of dust on the ceramic bar, would cause the latter to act like a coaxial line, which would be the cause of considerable errors.

The frequency variations $\Delta f$ which are capable of being achieved with the aid of this inventive arrangement, in dependence upon the depth of immersion of the bar X (expressed in millimeters) as measured from diaphragm 6 at the wall of flange 3 into the cavity resonator, are shown in FIG. 2. A comparison with the frequency variations which are achievable within the same frequency range with the aid of the usual tuning or adjusting screw, in which a movement or stroke of only one millimeter causes a frequency variation of 100 mc./s., demonstrates particularly well the usefulness of the present tuning arrangement aimed at effecting a mechanical automatic frequency readjustment. With the instant inventive arrangement it is possible to achieve a retuning accuracy of the klystron frequency of ±1 mc./s., when admitting an easily realizable tolerance of the mechanical adjusting accuracy of the bar of ±0.5 millimeter.

The introduction of the ceramic bar through the angular waveguide section as shown in the example of embodiment of FIG. 1, however, has the disadvantage that the ceramic bar has to be made relatively long. If the guidance of the bar is not very exact, it is likely that noise modulation will appear, with the occurrence of vibrations. The exact guidance of a long ceramic bar having a thickness of only about two millimeters, however, entails considerable difficulty, since this guidance is also required to be independent of temperature.

Furthermore, when coupling a load to a klystron oscillator it is well-known that generally there is a difficulty in that the "optimum load" matching condition in which the optimum power is taken from the klystron, does not coincide with the "matched load" condition in which the klystron is terminated in a reflection-free manner by the characteristic impedance of the output coupling waveguide. A maximum output of the klystron is only obtained with respect to a very specific deviation of the terminal resistance from the characteristic impedance of the waveguide. According to a further embodiment of the invention both of these difficulties are eliminated by the exemplified embodiment of the invention shown in FIG. 3. In this case the waveguide 15 which, in this particular case does not need to be designed as an angular member or section, is flanged in a staggered or off-set fashion to the cavity resonator 12 of the klystron tube. The flange of the waveguide coupling section 15 is provided with a boring through which the ceramic bar 17 is permitted to pass into the klystron resonator 12 through the diaphragm opening 16. The depth of penetration into the cavity, X, of FIGURE 2, is similarly applied as measured from diaphragm 16. In this case there is again provided a grommet 18 of insulating material, and the thickness of the wall of the flange is dimensioned in accordance with the considerations referred to in connection with the example of embodiment shown in FIG. 1.

In this type of arrangement it is possible that the ceramic bar projecting into the cavity resonator can be designed substantially shorter, and that by correspondingly dimensioning the staggering length $y$, the input impedance, considering the proximity effect of the diaphragm of the klystron resonator, can be made equal to the "optimum load," while the input impedance of the staggered waveguide, without considering the diaphragm of the klystron resonator will correspond to the "matched load."

It has been proven by exact investigations carried out on a klystron tube of the well known commercially available type VA 222, manufactured by Varian Associates, within the 7-gigacycle or kilomegacycle range, that a smaller staggered length $y$ will achieve a maximum power output than would be necessary for mechanical reasons when leading the ceramic bar through the flange of the coupling section. By inserting a series inductance in the form of a milled-out flange portion 19 it will now be possible to further reduce the difference of the power output of the klystron between the "optimum load" and the "matched load," with a greater staggered length of about $y=7$ millimeters. The conditions existing in this example of embodiment of the invention are shown in the diagram of FIG. 4. In this diagram the dashlined curve designated $b$ applies to the power output N in watts (W) versus frequency in gigacycles of a staggered waveguide according to FIG. 3, and the solid curve designated $a$ refers to the "optimum load," while the dot-and-dash-lined curve $c$ refers to the "matched load." While only two embodiments have been illustrated, it is apparent that the invention is not limited to the exact forms or uses shown and that many other variations may be made in the particular design and configuration without departing from the scope of the invention as set forth in the appended claims.

What is claimed is:

1. An arrangement for effecting the fine mechanical tuning of directly modulated klystrons comprising an attached rectangular cavity resonator and an output coupling diaphragm, first coarse frequency tuning means positioned in said cavity for adjustment in a parallel relation with respect to the electric field therein, second fine frequency tuning means for adjusting the resonant frequency of the klystron resonator including a bar of non-conducting material having a high dielectric constant positioned transversely of said electric field and having one end projecting axially into the cavity through said coupling diaphragm at a position below and adjacent said first tuning means, the frequency variation being dependent upon the distance said bar projects therein from said diaphragm, and output means receiving energy from said resonator, said bar being slidably arranged and supported at another portion in a wall of said output means lying outside the resonator.

2. An arrangement according to claim 1, wherein said output means comprises a waveguide flanged to said cavity resonator and wherein said first tuning means is in the form of a metallic screw and said bar is formed of ceramic material and is supported at one end by the outer wall of said waveguide and projects into said waveguide through a grommet of insulating material and extends across said waveguide to said coupling diaphragm.

3. An arrangement according to claim 1, including a waveguide section flanged to the resonator and off-set from the axis thereof and wherein said first tuning means is in the form of a metallic screw and said bar is formed of ceramic material projecting into the resonator through the diaphragm thereof and supported in a grommet positioned in a boring in the flange of the waveguide section.

4. An arrangement according to claim 3, wherein said waveguide is offset by a length which provides substantially the optimum load to the klystron.

5. An arrangement according to claim 3, wherein a portion of said waveguide flange around said bar is removed to form a series inductance whereby the difference between "optimum load" and "matched load" is minimized.

References Cited by the Examiner

UNITED STATES PATENTS

| | | | |
|---|---|---|---|
| 2,406,402 | 8/1946 | Ring | 315—5.53 X |
| 2,758,287 | 8/1956 | Jacobsen et al. | 333—98 |
| 2,899,599 | 8/1959 | Salisbury et al. | 333—83 X |
| 2,931,992 | 4/1960 | Caroselli | 333—83 |
| 2,940,002 | 6/1960 | Rockwell | 315—5.46 |
| 3,041,450 | 6/1962 | Parker | 333—83 X |
| 3,045,146 | 7/1962 | Haegele et al. | 315—5.53 X |
| 3,066,267 | 11/1962 | Menhenett | 333—83 |
| 3,098,207 | 7/1963 | Gordon | 333—98 |

FOREIGN PATENTS

| | | |
|---|---|---|
| 307,494 | 8/1955 | Switzerland. |

ELI LIEBERMAN, *Acting Primary Examiner.*

GEORGE N. WESTBY, HERMAN KARL SAALBACH, *Examiners.*